United States Patent [19]
Amine et al.

[11] Patent Number: 5,998,064
[45] Date of Patent: Dec. 7, 1999

[54] NEGATIVE ACTIVE MATERIAL FOR LITHIUM SECONDARY BATTERY AND PRODUCING METHOD THEREOF

[75] Inventors: Khalil Amine; Yuko Fujita, both of Kyoto, Japan

[73] Assignee: Japan Storage Battery Co., Ltd., Kyoto, Japan

[21] Appl. No.: 08/958,297

[22] Filed: Oct. 27, 1997

[30] Foreign Application Priority Data

Oct. 25, 1996 [JP] Japan .................................. 8-301081

[51] Int. Cl.$^6$ ...................................................... H01M 4/48
[52] U.S. Cl. ...................... 429/218.1; 423/618; 423/593
[58] Field of Search .................. 429/218.1; 423/618, 423/593

[56] References Cited

U.S. PATENT DOCUMENTS

| 5,567,539 | 10/1996 | Takahashi et al. ......................... 429/57 |
| 5,618,640 | 4/1997 | Dota et al. .............................. 429/194 |
| 5,683,834 | 11/1997 | Fujimoto et al. ......................... 429/218 |

FOREIGN PATENT DOCUMENTS

| 0205856 | 12/1986 | European Pat. Off. . |
| 0671774 | 9/1995 | European Pat. Off. . |

OTHER PUBLICATIONS

Mikhail, et al., "Self–diffusion of sodium ion in hydrous stannic oxide . . . ", Solid State Ionics, vol. 82, issue: 1–2, pp. 75–83, Nov. 15, 1995.
Howie et al., abstract of "Crystal data and formula for hydrous tin (II) oxide", Amer. Mineral. (1973), 58 (5–6), 552; Chemical Abstracts Accession Number 79:10831 (no month).
Patent Abstracts of Japan, vol. 097, No. 003, Mar. 31, 1997 for JP 08 315860 A (Fuji Photo Film Co. Ltd.), Nov. 29, 1996.
Patent Abstracts of Japan, vol. 005, No. 176 (E–081), Nov. 12, 1981 for JP 56 103872 A (Citizen Watch Co., Ltd.), Aug. 19, 1981.
Patent Abstracts of Japan, vol. 096, No. 002, Feb. 29, 1996 for JP 07 288123 A (Fuji Photo Film Co., Ltd.), Oct. 31, 1995.

*Primary Examiner*—Maria Nuzzolillo
*Assistant Examiner*—Carol Chaney
*Attorney, Agent, or Firm*—Sughrue, Mion, Zinn, Macpeak & Seas, PLLC

[57] ABSTRACT

A negative active material for lithium secondary battery contains a tin oxyhydroxide or a complex oxyhydroxide of tin and other elements such as Mg, Ca, Ni, Mn, V, Ti, Pb, Al, Ge, As, Si and/or Sb.

24 Claims, 2 Drawing Sheets

NEGATIVE ACTIVE MATERIAL FOR LITHIUM SECONDARY BATTERY AND PRODUCING METHOD THEREOF

BACKGROUND OF THE INVENTION

1. Field of the Invention

This invention relates to a negative active material for a lithium secondary battery and a producing method thereof.

2. Description of the Related Art

Lithium secondary battery is generally composed of a positive electrode made of a compound which can accommodate and release lithium ions, a negative electrode made of carbon or the like capable of accommodating and releasing metallic lithium, lithium alloy or lithium ions and an organic electrolyte in which a lithium salt is dissolved in an organic solvent or polymer electrolytes, and shows remarkably high voltage and high energy density.

As a compound to be used as the positive electrode capable of accommodating and releasing lithium ions, lithium cobaltate ($LiCoO_2$), lithium nickelate ($LiNiO_2$), spinel type lithium manganese oxide ($LiMn_2O_4$), vanadium oxide ($V_2O_5$, $V_3O_{11}$) and the like are well known.

As the negative electrode, the just described materials are well known, and other metal oxides capable of accommodating and releasing lithium have also been reported, such as a lithium titanium spinel oxide ($LiTi_2O_4$ or $Li_{4/3}Ti_{5/3}O_4$) (T. Ohzuku et al., JECS, 142, 1431 (1995)), an oxide mainly composed of tin (Unexamined Japanese Patent Publications (kokai) Nos. 7-12274, 7- 201318, 7-288123), an oxide mainly composed of silicon (Unexamined Japanese Patent Publication No. 6-325765, EP 0615296 A1) and the like.

Lithium secondary battery can be classified into two types depending on the combination of positive and negative electrodes when the battery is firstly assembled. One is a combination of a positive electrode which does not contain lithium with a negative electrode comprised of a material that contains metallic lithium and metals (charged state), and the other is a combination of a positive electrode comprised of a material which contains lithium with a negative electrode comprised of a material that does not contain lithium (uncharged state). A typical example of the former case is a combination of a positive electrode comprised of vanadium oxide with a negative electrode comprised of metallic lithium. In this case, the following charge and discharge reactions occur, and discharge is firstly carried out when the battery is used for example, as indicated in the following formulae.

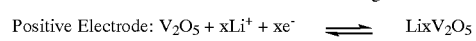
(1)

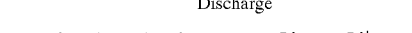
(2)

A typical example of the latter case is a combination of a positive electrode comprised of lithium cobalt oxide ($LiCoO_2$) with a negative electrode comprised of graphite (C). In this case, the charge and discharge reactions progress in accordance with the following formulas, and the charging reaction is firstly carried out after assembly of the battery.

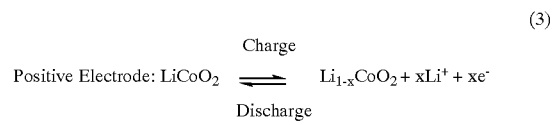
(3)

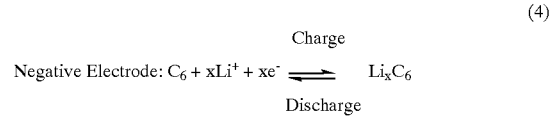
(4)

In the metallic lithium battery based on the formulas (1) and (2), short circuit is apt to occur when the charging and discharging are repeated, due to lithium dendritic deposition on the surface of the electrode, and there is a danger of causing abnormal generation of heat and increment of pressure inside the battery, so that it has not been used practically. Substitution of metallic lithium by lithium alloy can hardly change the situation.

In the case of the battery based on the formulas (3) and (4), on the contrary, lithium is inserted in or released from the active material in the form of ions (because of this, this type of battery is particularly called lithium ion secondary battery), so that deposition of metallic lithium can be avoided, its charge and discharge cycle life becomes longer and high safety is ensured. Because of these reasons, lithium ion secondary batteries are now widely put to practical use.

It is desirable that the active materials of positive and negative electrodes have large capacity per unit weight or unit volume and high battery voltage (higher in the case of positive electrode and lower in the case of negative electrode based on $Li/Li^+$).

As the negative active material, graphite or amorphous carbon is currently put into practical use, and it has been reported that, in the former case, 1 mole at the maximum of lithium is intercalated into 6 moles of carbon atoms ($LiC_6$) and its theoretical capacity density becomes 372 mAh/g, while a capacity density of 500 to 600 mAh/g is obtained in the latter case, though not fully elucidated theoretically. However, in view of discharge voltage, graphite shows a flat potential of about 0.1 V (based on $Li/Li^+$), while electric potential of amorphous carbon gradually becomes higher as the discharge progresses and reaches about 0.5 V in average with relatively low battery voltage.

On the other hand, when considered from the viewpoint of energy consumption at the time of producing these carbon materials, they are produced at relatively high temperatures of 2,000° C. or more in the case of graphite and that of 800 to 1,000° C. in the case of amorphous carbon Therefore, the amount of energy consumption is considerably large in both cases, particularly in the case of graphite. Further, from a different view point in terms of the quality control for producing these carbon materials, quality control can be made easily in the case of graphite because of its well developed crystals which make possible precise measurement of the crystal lattice constant by a powder X-ray diffraction as a relatively simple and easy method, while quality control is not easy in the case of amorphous carbon, because clear diffraction peaks cannot be obtained by the powder X-ray diffraction method.

Thus, though they are similar carbon materials, graphite and amorphous carbon have their own respective merits and demerits. Accordingly, when one of them must be selected as the negative active material for lithium ion battery use, the selection is based on their important properties. In any case, the negative electrode using a carbon material is not stable when lithium ions are accommodated in advance which is also a complicated step. Consequently, it is built into the battery generally under an uncharged state (a state of no insertion of lithium ions).

Of the aforementioned lithium titanium spinel type oxides, the material having a composition of $Li_{4/3}Ti_{5/3}O_4$ has problems in that its capacity density is about 170 mAh/g which is small when compared with carbon materials, and its discharge potential is about 1.5 V (based on Li/Li+) which is considerably high. However, since lithium is included at the time of producing, these materials exert an advantage when they are made into charged state at the time of the battery assembly.

On the other hand, it has been reported that the aforementioned tin oxides (Sn(II)O having an $\alpha$-$PbO_2$ structure and $Sn(IV)O_2$ having a rutile structure) have a capacity density of about 500 mAh/g which is almost the same as that of amorphous carbon (Unexamined Japanese Patent Publication (kokai) No. 7-235293). The publication also describes methods of preparation in the case of $SnO_2$ for example, it is produced by a method in which a precipitate obtained from a mixture solution of a tin salt and an alkali hydroxide is subjected to iD heat treatment at a temperature of 250° C. or more, preferably 400° C. or more. In this connection, the above report describes that sharp decrease in the discharge capacity density is not found by 10 cycles of the charge discharge cycle, but does not describe test results of more larger charge discharge cycles.

As described in the foregoing, there are a number of negative active materials for use in the lithium secondary battery, but when they are viewed in terms of their characteristics and producing steps, they are not excellent in all points because they have their own respective merits and demerits. In other words, the choices may vary depending on what points should come before all others as evaluation criteria of the negative active material.

SUMMARY OF THE INVENTION

It is an object of the present invention to provide a negative active material which exerts more excellent properties when three points, namely, large capacity density, small energy consumption at the time of production and easy quality control, are preferentially used as the evaluation criteria.

The present invention realizes the aforementioned object by using a tin oxyhydroxide as a negative active material.

The present invention provides a negative active material for lithium secondary battery use which is excellent in terms of large capacity density, low energy consumption at the time of its production and high crystallinity, and its industrial value is markedly large.

DETAILED DESCRIPTION OF THE INVENTION

Figure 1:
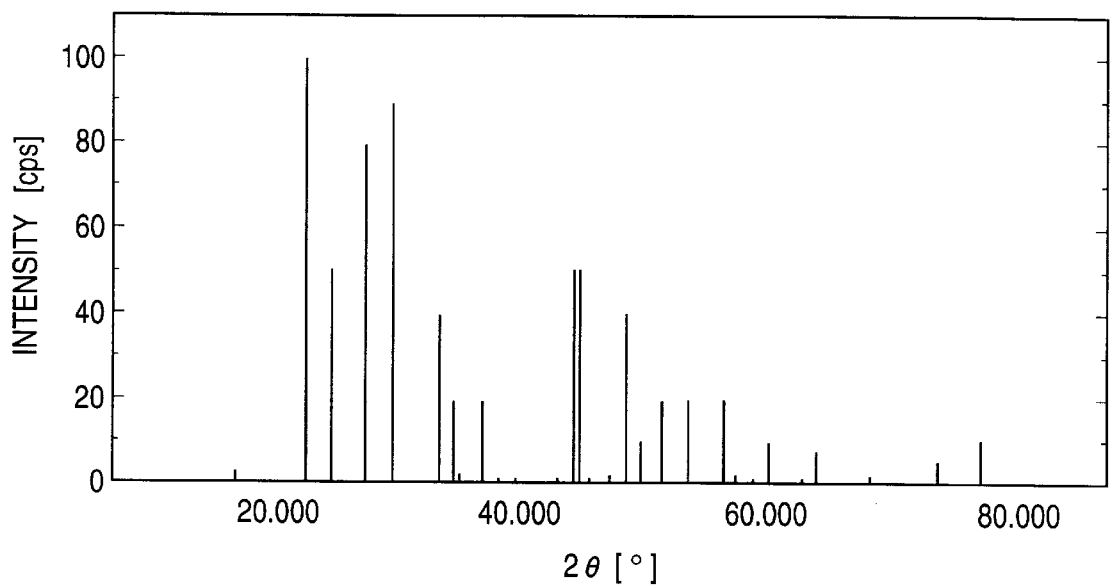
FIG. 1 is a graph showing a typical X-ray diffraction pattern of the stannous oxyhydroxide of the present invention.

Detailed description of the invention will be described as follows referring to the accompanying drawings.

As tin oxyhydroxide, there are stannous oxyhydroxide represented by a chemical formula $Sn(II)_3(OOH)_2$ or $Sn(II)_3O_2(OH)_2$ and stannic oxyhydroxide represented by a chemical formula $Sn(IV)_3(OOH)_4$ or $Sn(IV)_3O_4(OH)_4$. The inventors of the present invention have found that these materials, when used as negative active materials of the lithium ion battery, show a remarkably large capacity density of about 800 mAh/g within the discharge potential range of from 0.2 to 1.5 V (based on Li/Li+), which is similar to or larger than that of amorphous carbon or tin oxide.

The tin oxyhydroxide is charged as a first step to allow lithium insertion and then discharged to extract lithium out. In general, an amount of lithium corresponding to an electricity quantity of 1,000 mAh/g or more is obtained in the first charging step, while lithium corresponding to an electricity quantity of about 800 mAh/g is discharged by the subsequent discharging step. However, the charged and discharged electricity quantities become close to each other in and after the second charging step. Although there are a number of still unclear points with regard to the reaction mechanism of this material in these charging and discharging steps, it is certain that the material accommodates lithium in the charging step and releases it in the discharging step because, when changes in its potential is viewed, at least it becomes higher than the potential (0 V, based on Li/Li+) at which metallic lithium undergoes electrodeposition.

The tin oxyhydroxide is obtained in general by adding an aqueous solution of an alkali hydroxide or an ammonium hydroxide to an aqueous solution or organic solvent solution such as ethanol of a tin salt, and subjecting the thus obtained precipitate to filtration washing and subsequent heat drying treatment at 150° C. or less. A negative active material for lithium ion secondary battery obtained at such a low temperature of 150° C. or less has not been found conventionally. Accordingly, it can be said that this active material is markedly excellent from the viewpoint of its low energy consumption. Also, stannous oxyhydroxide bears sufficiently developed crystallinity at such a low temperature heat drying step, so that remarkably clear X-ray diffraction pattern can be obtained which is considerably advantageous in view of quality control.

In this connection, the aforementioned tin oxide and the tin oxyhydroxide of the present invention are completely different materials as a matter of course.

Also, Unexamined Japanese Patent Publication (kokai) No. 7-20318 describes a method in which a mixture consisting of a lithium salt and stannic oxyhydroxide is treated by solid phase baking, as one of the methods for producing complex lithium tin oxides having a structure of $Li_xSnO_y$ to be used as a negative active material of lithium secondary battery. In this case, $Li_xSnO_y$ is used as a negative active material in charged state unlike the case of tin oxide, while stannic oxyhydroxide is merely a starting material for producing $Li_xSnO_y$, and there is no description or suggestion about a possibility that the stannic oxyhydroxide itself could become a negative active material. Moreover, it does not describe about stannous oxyhydroxide. In other words, the fact that tin oxyhydroxides function effectively as a negative active material which is built into a battery under uncharged state was not known conventionally but discovered by the present inventors.

Of the tin oxyhydroxides, stannous oxyhydroxide may be produced typically and desirably by dissolving stannous chloride ($SnCl_2$) in water containing an extremely small amount of hydrochloric acid, adding liquid ammonia to the solution to generate precipitation, washing the precipitate by filtration and then employing a drying step at 80° C. to remove water. It is considered that this reaction progresses as follows.

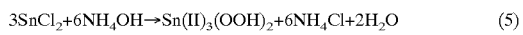
$$3SnCl_2 + 6NH_4OH \rightarrow Sn(II)_3(OOH)_2 + 6NH_4Cl + 2H_2O \quad (5)$$

The thus obtained stannous oxyhydroxide $Sn(II)_3(OOH)_2$ shows an X-ray diffraction pattern shown in FIG. 1 when it is pure, but it may contain unknown impurities in some cases. Even stannous oxyhydroxide containing some quantity of impurities can function sufficiently as the negative active material.

Of the starting materials for the production of stannous oxyhydroxide, the tin compound is not limited to the aforementioned stannous chloride, and other inorganic or organic acid stannous salt may be used. Also, other alkali hydroxide aqueous solution may be used in stead of liquid ammonia. In addition, as the solvent of stannous salt and alkali hydroxide, not only water but also organic solvent such as methanol or a mixture of water and an organic solvent may be effective in some cases. On the other hand, stannous salts are slightly soluble in solvents in most cases but become soluble when a small amount of an acid is added, and not only hydrochloric acid but also nitric acid, sulfuric acid or the like inorganic acid or acetic acid or the like organic acid can be used as the acid.

The heat drying treatment of stannous oxyhydroxide as the precipitate is carried out desirably at a temperature of about 80° C. as described in the foregoing. However, a more higher temperature may be employed as long as decomposition of stannous oxyhydroxide does not occur. In the case of stannic oxyhydroxide, a stannic salt may be used as the starting material of the tin salt.

In the aforementioned tin oxyhydroxide, it may be effective in some cases to substitute a portion of tin by other elements. As the substitution elements, Mg, Ca, Ni, Mn, V, Ti, Pb, Al, Ge, As, Si and Sb are effective. Namely, the negative active material according to the present invention contains at least one oxyhydroxide of Mg, Ca, Ni, Mn, V, Ti, Pb, Al, Ge, As, Si and Sb.

The aforementioned tin oxyhydroxide has a small electric conductivity by itself. Therefore, when it is made into a negative electrode, it may be mixed with carbon or the like powder having conductivity and coated on an electrode substrate together with an appropriate binder. In addition, it is most desirable that a negative electrode which uses tin oxyhydroxide as the active material is built into a battery in combination with a positive electrode which uses a lithium-containing positive active material ($LiCO_2$ for example).

However, it is possible that a lithium-containing negative electrode is prepared in advance by subjecting a tin oxyhydroxide negative electrode to electrolytic reduction in an electrolytic bath containing an organic electrolyte, using metallic lithium, a lithium alloy or a lithium-containing lithium intercalation substance as the counter electrode, and the thus prepared lithium-based tin oxyhydroxide negative electrode is built into a battery in combination with a lithium-free positive electrode ($V_2O_5$ for example).

EXAMPLE 1

Figure 2:
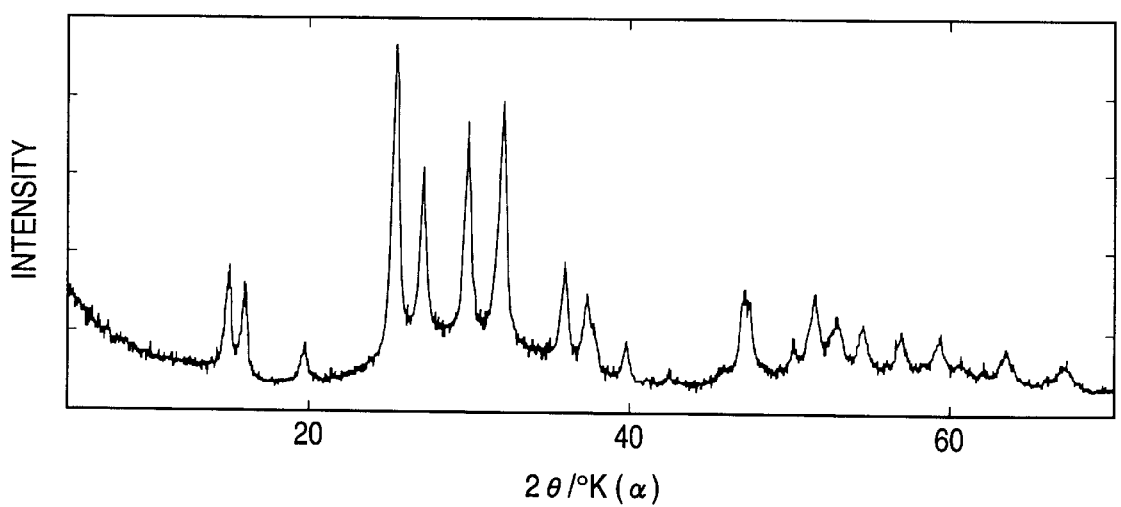
FIG. 2 is a graph showing an X-ray diffraction pattern of a tin oxyhydroxide of Example 1 of the present invention.

5 g of stannous chloride was dissolved and stirred in 0.2% nitric acid aqueous solution to which 40 ml of liquid ammonia was subsequently added to obtain a precipitate. This precipitate was collected by filtration, washed with water and then dried at 80° C. Powder X-ray diffraction pattern of the thus obtained material is as shown in FIG. 2. It is evident from all of the diffraction peaks that this material is stannous oxyhydroxide $Sn_3O_2(OH)_2$ (or $Sn_3(OOH)_2$). In this connection, the two peaks indicated by a mark * in the low angle side of FIG. 2 are assumed to be due to impurities, though not clear yet. This material was assigned to a space group P4/mnc, and its unit lattice constant was a=7.89 Å and c=9.01 Å.

Figure 3:
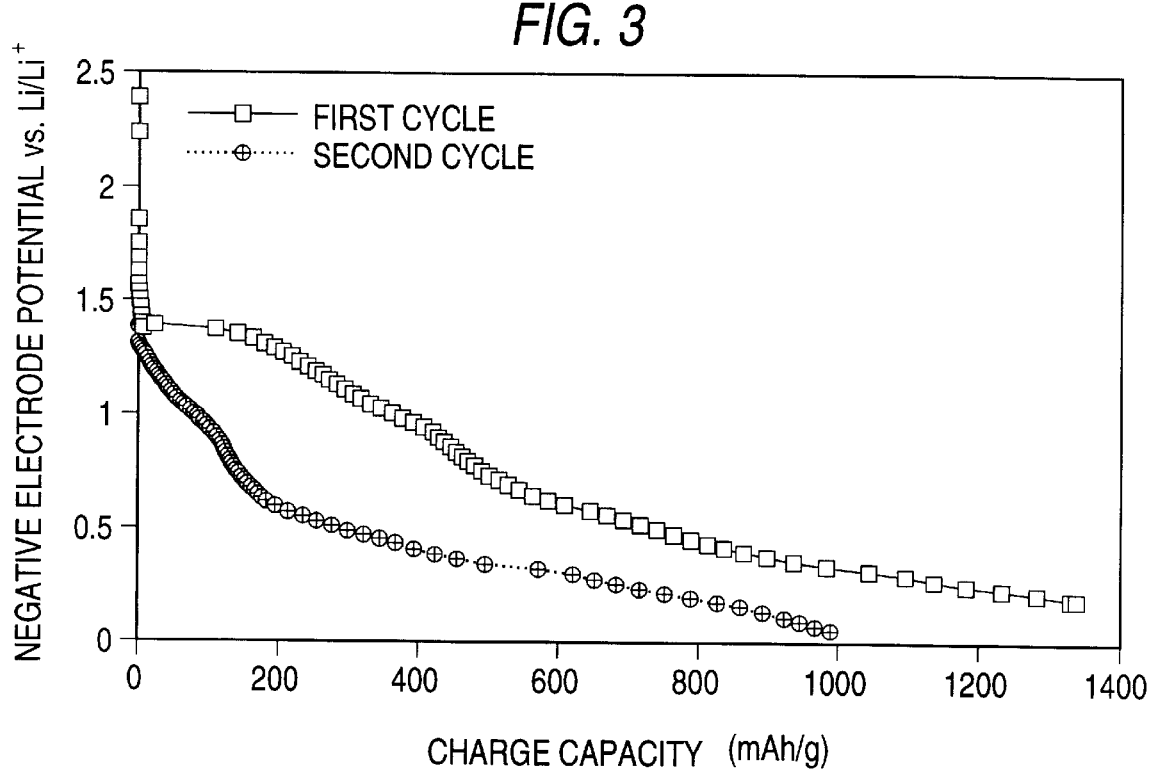
FIG. 3 is a graph showing charging characteristics of a negative electrode for lithium secondary battery use in which a negative active material of Example 1 of the present invention is used.
Figure 4:
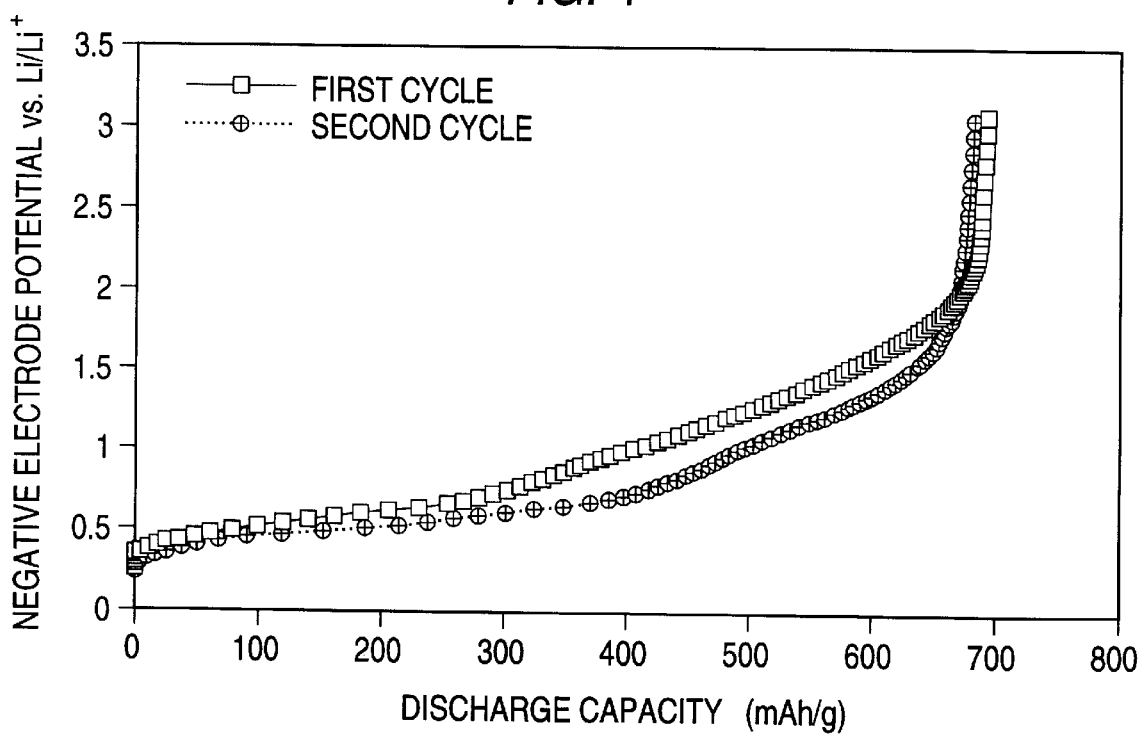
FIG. 4 is a graph showing a discharging curve of a negative electrode for lithium secondary battery use in which a negative active material of Example 1 of the present invention is used.

Next, a mixture containing 77% of the stannous oxyhydroxide powder, 9% of acetylene black as a conductive agent and 14% of polyvinylidene fluoride-n-methyl pyrrolidone solution as a binder was coated and pressed on a stainless steel net and used as a negative electrode. This negative electrode, together with a metallic lithium plate used as a counter electrode, was soaked in an electrolyte composed of a solution of 1 mol % $LiClO_4$ dissolved in an organic solvent mixture (ethylene carbonate, diethyl carbonate and dimethyl carbonate) and subjected to a charge-discharge test. The test was firstly started with charging at a current density of 0.5 mA/cm$^2$ and then discharging was carried out. Charging characteristics of the negative electrode in the first and second cycles are shown in FIG. 3, and its discharging characteristics in FIG. 4. Although the discharging capacity against charging capacity is considerably small, it is evident that a fairly large discharging capacity of 700 mAh/g can be obtained.

EXAMPLE 2

Stannous oxyhydroxide was obtained by repeating the procedure of Example 1, except that stannous acetate, in stead of stannous chloride, was dissolved in water acidified with nitric acid and then liquid ammonia was added. The discharge capacity was fairly large with 800 mAh/g.

EXAMPLE 3

Stannous oxyhydroxide was obtained by repeating the procedure of Example 1, except that stannous chloride was dissolved in ethanol in stead of water and then ethanol solution of ammonia was added. The discharge capacity was fairly large with 780 mAh/g.

EXAMPLE 4

A complex oxyhydroxide of $Sn_{2.8}Mg_{0.2}(OOH)_2$ was obtained by repeating the procedure of Example 1, except that stannous chloride and magnesium chloride were dissolved in 0.2% hydrochloric acid aqueous solution, and sodium hydroxide aqueous solution was added thereto. This material showed a discharge capacity density of about 500 mAh/g as a negative active material.

What is claimed is:

1. A lithium secondary battery comprising a positive electrode, a negative electrode and an electrolyte, wherein the negative electrode comprises a negative active material comprising a tin oxyhydroxide.

2. A lithium secondary battery according to claim 1, where a part of tin in said tin oxyhydroxide is substituted with at least one element selected from the group consisting of Mg, Ca, Ni, Mn, V, Ti, Pb, Al, Ge, As, Si and Sb.

3. A lithium secondary battery according to claim 1, wherein the tin oxyhydroxide is stannous oxyhydroxide.

4. A lithium secondary battery according to claim 1, wherein the tin oxyhydroxide is stannic oxyhydroxide.

5. A method for producing a lithium secondary battery comprising the steps of:

dissolving a tin salt in water, an organic solvent or a mixture solution of water and an organic solvent, adding thereto an aqueous solution of ammonium hydroxide or an alkali hydroxide to form a precipitate of a tin oxyhydroxide, forming a negative electrode from the tin oxyhydroxide, and forming a battery from a positive electrode, the negative electrode and an electrolyte.

6. A method for producing a lithium secondary battery according to claim 5, wherein a salt of an element selected from the group consisting of Mg, Ca, Ni, Mn, V, Ti, Pb, Al, Ge, As, Si and Sb is dissolved in water, an organic solvent or a mixture solution of water and an organic solvent with said tin salt to form a precipitate of a tin-containing complex oxyhydroxide.

7. A method for producing a lithium secondary battery according to claim 5, wherein an acid is dissolved in said water.

8. A method for producing a lithium secondary battery according to claim 5, further comprising the step of: after said aqueous solution adding step, drying and heating said precipitate at a temperature not more than 150° C.

9. A negative electrode comprising comprising a negative active material and a binder, wherein the negative active material comprises tin oxyhydroxide.

10. A negative electrode according to claim 9, where a part of tin in said tin oxyhydroxide is substituted with at least one element selected from the group consisting of Mg, Ca, Ni, Mn, V, Ti, Pb, Al, Ge, As, Si, and Sb.

11. A negative electrode according to claim 9, wherein the tin oxyhydroxide is stannous oxyhydroxide.

12. A negative electrode according to claim 9, wherein the tin oxyhydroxide is stannic oxyhydroxide.

13. A negative active material for a lithium secondary battery comprising a tin oxyhydroxide, where a part of tin in said tin oxyhydroxide is substituted with at least one element selected from the group consisting of Mg, Ca, Ni, Mn, V, Ti, Pb, Al, Ge, As, Si, and Sb.

14. A negative active material for a lithium secondary battery use according to claim 13, wherein the tin oxyhydroxide is stannous oxyhydroxide.

15. A negative active material for a lithium secondary battery use according to claim 13, wherein the tin oxyhydroxide is stannic oxyhydroxide.

16. A method for producing a negative electrode comprising the steps of:

dissolving a tin salt in water, an organic solvent or a mixture solution of water and an organic solvent, adding thereto an aqueous solution of ammonium hydroxide or an alkali hydroxide to form a precipitate of a tin oxyhydroxide, and forming a negative electrode from the tin oxyhydroxide.

17. A method for producing a negative electrode according to claim 16, wherein a salt of an element selected from the group consisting of Mg, Ca, Ni, Mn, V, Ti, Pb, Al, Ge, As, Si and Sb is dissolved in water, an organic solvent or a mixture solution of water and an organic solvent with said tin salt to form a precipitate of a tin-containing complex oxyhydroxide.

18. A method for producing a negative electrode according to claim 16, wherein an acid is dissolved in said water.

19. A method for producing a negative electroce according to claim 16, further comprising the step of: after said aqueous solution adding step, drying and heating said precipitate at a temperature not more than 150° C.

20. A method for producing a negative active material for a lithium secondary battery comprising the steps of:

dissolving a tin salt in water, an organic solvent or a mixture solution of water and an organic solvent, and adding thereto an aqueous solution of ammonium hydroxide or an alkali hydroxide to form a precipitate of a tin oxyhydroxide, wherein a salt of an element selected from the group consisting of Mg, Ca, Ni, Mn, V, Ti, Pb, Al, Ge, As, Si and Sb is dissolved in water, an organic solvent or a mixture solution of water and an organic solvent with said tin salt to form a precipitate of a tin-containing complex oxyhydroxide.

21. A method for producing a negative active material for a lithium secondary battery according to claim 20, wherein an acid is dissolved in said water.

22. A method for producing a negative active material for a lithium secondary battery according to claim 20, further comprising the step of: after said aqueous solution adding step, drying and heating said precipitate at a temperature not more than 150° C.

23. A method for producing a negative active material for a lithium secondary battery comprising the steps of:

dissolving a tin salt in water, an organic solvent or a mixture solution of water and an organic solvent, and adding thereto an aqueous solution of ammonium hydroxide or an alkali hydroxide to form a precipitate of a tin oxyhydroxide, wherein an acid is dissolved in said water.

24. A method for producing a negative active material for a lithium secondary battery according to claim 23, further comprising the step of: after said aqueous solution adding step, drying and heating said precipitate at a temperature not more than 150° C.

* * * * *